United States Patent
Karame et al.

(10) Patent No.: US 10,713,731 B2
(45) Date of Patent: Jul. 14, 2020

(54) METHOD FOR SECURE LEDGER DISTRIBUTION AND COMPUTER SYSTEM USING SECURE DISTRIBUTED LEDGER TECHNOLOGY

(71) Applicant: NEC Europe Ltd., Heidelberg (DE)

(72) Inventors: Ghassan Karame, Heidelberg (DE);
Wenting Li, Heidelberg (DE);
Alessandro Sforzin, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 720 days.

(21) Appl. No.: 15/216,709

(22) Filed: Jul. 22, 2016

(65) Prior Publication Data

US 2018/0025435 A1    Jan. 25, 2018

(51) Int. Cl.
| | |
|---|---|
| *H04L 9/32* | (2006.01) |
| *G06Q 20/06* | (2012.01) |
| *G06Q 40/00* | (2012.01) |
| *G06Q 20/02* | (2012.01) |

(Continued)

(52) U.S. Cl.
CPC ............ *G06Q 40/12* (2013.12); *G06Q 20/02* (2013.01); *H04L 9/3236* (2013.01); *G06Q 2220/00* (2013.01); *H04L 2209/38* (2013.01); *H04L 2209/56* (2013.01)

(58) Field of Classification Search
CPC .... G06Q 20/24; G06Q 20/3829; G06Q 40/00; G06Q 20/40
See application file for complete search history.

(56) References Cited

U.S. PATENT DOCUMENTS

| | | | | |
|---|---|---|---|---|
| 2016/0012424 | A1* | 1/2016 | Simon | G06Q 20/3674 705/67 |
| 2016/0330034 | A1* | 11/2016 | Back | G06Q 20/06 |
| 2017/0109744 | A1* | 4/2017 | Wilkins | H04L 9/3236 |

(Continued)

FOREIGN PATENT DOCUMENTS

JP    5858507 B1    2/2016

OTHER PUBLICATIONS

Elli Androulaki, et al., "Hiding Transaction Amounts and Balances in Bitcoin", In Proceedings of International Conference on Trust & Trustworthy Computing (Trust), Jun. 30, 2014, pp. 161-178.

(Continued)

*Primary Examiner* — Talia F Crawley
(74) *Attorney, Agent, or Firm* — Leydig, Voit & Mayer, Ltd.

(57) ABSTRACT

A method of providing secure ledger distribution for interbank settlement includes establishing a private sidechain among a centralized computer system of a central bank and computer systems of at least a sender bank and a receiver bank, each of which have an account with the central bank. The centralized computer system receives a transaction from the computer system of the sender bank as a payment request. The centralized computer system determines whether the transaction is valid. Consensus is reached within the private sidechain. The centralized computer system forwards the transaction to the computer system of the receiver bank along with a finality proof. The accounts of the sender bank and the receiver bank are updated and the transaction is added to a private ledger accessible only within the private sidechain.

18 Claims, 2 Drawing Sheets

(51) Int. Cl.
*G06Q 20/24* (2012.01)
*G06Q 20/38* (2012.01)

(56) References Cited

U.S. PATENT DOCUMENTS

2017/0132633 A1* 5/2017 Whitehouse ....... G06Q 20/3274
2017/0243193 A1* 8/2017 Manian .............. G06Q 20/3829

OTHER PUBLICATIONS

Elli Androulaki, et al., "Evaluating User Privacy in Bitcoin", In Proceedings of the International Conference on Financial Cryptography and Data Security, (FC), Dec. 2013, pp. 34-51.
Frederik Armknecht, et al., "Ripple: Overview and Outlook", In Proceedings of International Conference on Trust & Trustworthy Computing (Trust), Aug. 24-26, 2015, pp. 163-180.
Joseph Bonneau, et al., "SoK: Research Perspectives and Challenges for Bitcoin and Cryptocurrencies", Security and Privacy (SP), 2015 IEEE Symposium on Security and Privacy, May 17-21, 2015, pp. 1-18.
Arthur Gervais, et al., "On the Privacy Provisions of Bloom Filters in Lightweight Bitcoin Clients", In Proceedings of the 30$^{th}$ Annual Computer Security Applications Conference (ACM ACSAC), Dec. 2014, pp. 326-335.
Arthur Gervais, et al., "Tampering with the Delivery of Blocks and Transactions in Bitcoin", In Proceedings of the ACM Conference on Computer and Communications Security (ACM CCS), Dec. 2015, pp. 692-705.
Arthur Gervais, et al., "Is Bitcoin a Decentralized Currency?", In IEEE Security and Privacy, May-Jun. 2012, pp. 54-60.
Ghassan Karame, et al., "Misbehavior in Bitcoin: A Study of Double-Spending and Accountability", Journal ACM Transactions on Information and System Security (TISSEC), vol. 18, issue 1, Jun. 2015, pp. 1-40.
Ghassan Karame, et al., "Two Bitcoins at the Price of One? Double-Spending Attacks on Fast Payments in Bitcoin", In Proceedings of the ACM Conference on Computer and Communications Security (CCS), Dec. 2012, pp. 1-17.
Adam Back, et al., "Enabling Blockchain Innovations with Pegged Sidechains", https://bitcointalkj.org/index.php?topic=305791.0, Oct. 22, 2014, pp. 1-25.
Giuliana Santos Veronese, et al., "Efficient Byzantine Fault-Tolerance", IEEE Transactions on Computers, vol. 62, No. 1, Jan. 2013, pp. 16-30.
Adam Back et al: "Enabling Blockchain Innovations with Pegged Sidechains", Oct. 22, 2014 (Oct. 22, 2014), XP055392256.
Richard Brown: "A simple explanation of Bitcoin Sidechains", Richard Gendal Brown: Thoughts on the future of finance, Oct. 26, 2014 (Oct. 26, 2014), XP055410949.
Asakawa Direct, "Blockchain Overheat," JP Mimgun and IBM, Nikkei Computer, Japan, Nikkei BP, Jul. 7, 2016, No. 916, pp. 26-29.

* cited by examiner

METHOD FOR SECURE LEDGER DISTRIBUTION AND COMPUTER SYSTEM USING SECURE DISTRIBUTED LEDGER TECHNOLOGY

FIELD

The present invention relates to distributed ledger technology and in particular to a method and computer system which provide for the secure real-time settlement of interbank transactions using the distributed ledger technology.

BACKGROUND

Currently, money transfers between banks may take up to several days due to numerous intermediate verification steps involved in the process. Conventional interbank transactions are realized by either transferring deposits to/from each bank, or by using a central bank. Using a central bank makes it possible in some cases to simplify the system and expedite settlement resolution. However, each transaction going through the central bank according to known systems requires numerous processing and verification steps, which consume computational resources and necessitate complex verification and security systems, thereby resulting in high transaction costs. Moreover, banking systems which store large volumes of financial information in order to perform settlement resolution have been targeted by specifically crafted hacks, malware, and data corruption.

In recent years, distributed ledger technologies have attracted considerable interest from both academia and industry alike. Unlike traditional database technology, distributed ledgers require neither a central administrator, nor a central data store. Instead, the ledger which can also be referred to as the block chain or, more specifically, the transaction history, is replicated among the nodes in the system, and a consensus algorithm ensures that each node's copy of the ledger is identical to every other node's copy.

SUMMARY

In an embodiment, the present invention provides a method of providing secure ledger distribution for interbank settlement includes. A private sidechain is established among a centralized computer system of a central bank and computer systems of at least a sender bank and a receiver bank, each of which have an account with the central bank. The centralized computer system receives a transaction from the computer system of the sender bank as a payment request. The centralized computer system determines whether the transaction is valid. Consensus is reached within the private sidechain. The centralized computer system forwards the transaction to the computer system of the receiver bank along with a finality proof. The accounts of the sender bank and the receiver bank are updated and the transaction is added to a private ledger accessible only within the private sidechain.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
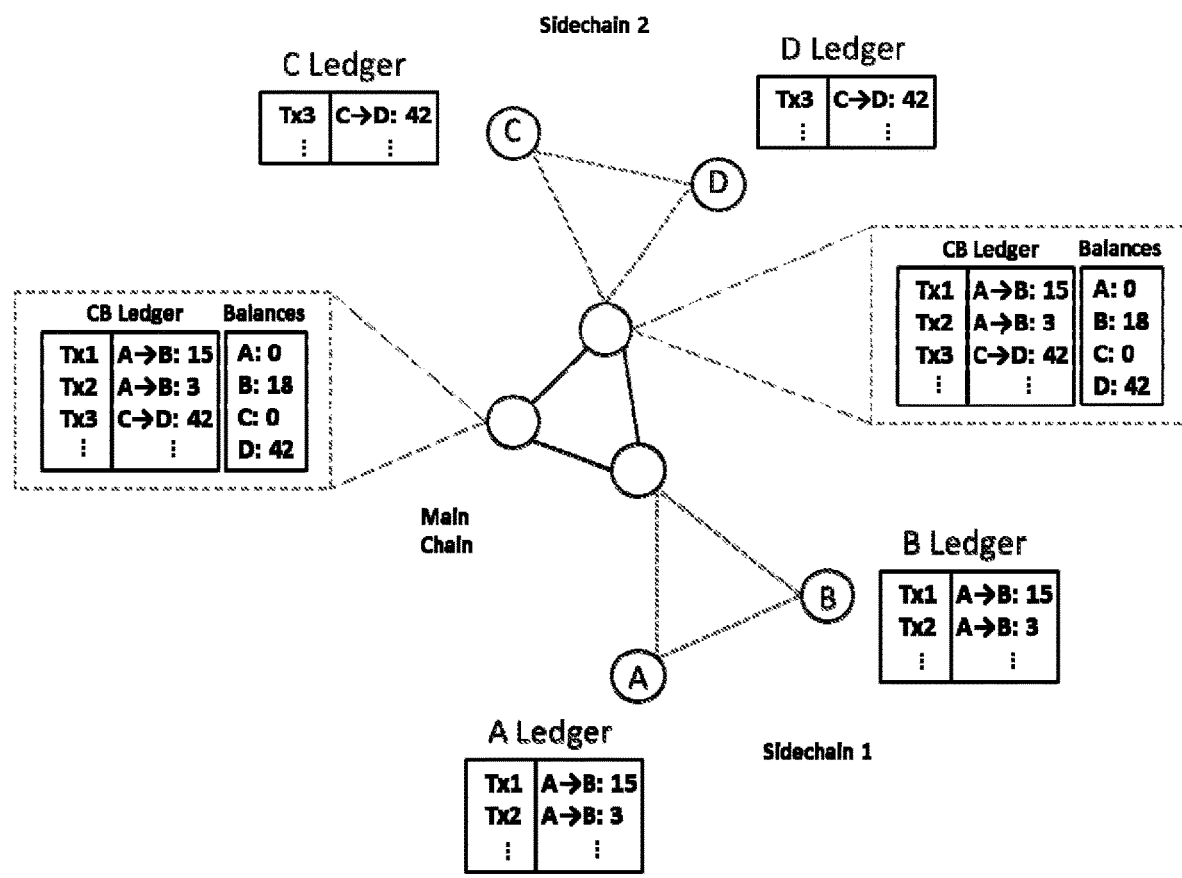
FIG. 1 schematically illustrates a computer system implementing the method according to an embodiment of the present invention.

In an embodiment, the present invention provides a method for settlement resolution using distributed ledger technology which provides governments and financial institutions the ability to achieve secure settlement in real-time, while at the same time reducing bureaucratic overhead.

The inventors have recognized that the known solutions for settlement resolution based on public shared ledgers expose a number of privacy issues which create risks to the financial institutions and endanger the private information of their users. On the one hand, as described by Gregory Maxwell, "Confidential Transactions: Preserve security while simultaneously obscuring transaction values" (retrieved on Jul. 11, 2016 from <<https://www.elementsproject.org/elements/confidential-transactions/>>), although confidential transactions can be used (in Bitcoin-like public ledgers) to allow only the recipient to acquire the transaction details, information is highly duplicated in the network, which decreases the incentive of the various participants to store a copy of the full transaction history. On the other hand, private ledgers in closed consortiums do not allow to send transactions from one private ledger to another, which reduces the flexibility of transactions across all institutes. Moreover, financial applications require regulations checks on all the interbank transactions. In an embodiment of the present invention, the central bank can be advantageously used to regulate all the transactions across the participating banks. Because each transaction through the central bank will incur costs and fees, an embodiment of the present invention aims to minimize the amount of necessary transactions/money transfers at the central bank when performing a payment in order to decrease such costs and fees. The resulting system according to an embodiment of the present invention, thereby provides a semi-decentralized mode of deployment and a new model which has not been heretofore used with distributed ledger technology.

In another embodiment, the present invention provides a computer system which implements the method of using the distributed ledger technology. The system provides real-time settlements resolution amongst a large number of financial institutions while catering for Byzantine behavior (e.g., malware, hacks) and minimizing the amount of necessary steps to fulfill a money transfer, and its related costs.

The computer system is composed of individual computer systems of central banks and non-central banks (referred to herein as regular banks) including computational processors, servers and memory thereof configured to implement rules on transactions and provide a consensus among them. The regular banks issue payment transactions to each other. In order to facilitate efficient payment and enforce financial regulations, central banks are involved in every related transaction to approve and audit payment transactions between banks. All regular banks maintain accounts in the corresponding central bank. This allows interbank transactions to be settled as intrabank transactions, and reflected on their deposit accounts in the central bank.

The central bank oversees and regulates all the transactions within the system. Since interbank transactions are settled on the banks' deposit accounts in the central bank, the central bank is involved in all transactions. Functions which can be performed by the central bank include:

full access to the deposit accounts of the regular banks in the system, including their balances and transaction histories;

approval or denial of transactions;

enforcement of some specific financial policies; and punishment of misbehaving banks (e.g., imposing economic sanctions on them).

The regular banks issue interbank transactions to each other. In accordance with an embodiment of the present invention, the following properties are defined for the regular banks:

the regular banks each have an account in the central bank, the balance of which can act as an upper bound to the amount of transactions they can issue; and the regular banks will only handle (receive, validate and process) transactions related to them and preferably will not have access to information for any transactions unrelated to them.

To tolerate system/Byzantine faults, the central bank preferably maintains multiple nodes on top of which a consensus network is established. A consensus network is used to increase the reliability of the distributed system in case of faulty machines.

Preferably, efficient Byzantine fault tolerance (EBFT) is used as the consensus protocol. EBFT has been described, for example, by G. S. Veronese et al., "Efficient Byzantine fault tolerance," IEEE Transactions on Computers, 62(1), 16-30 (2013) which is hereby incorporated herein by reference. EBFT is a revised practical Byzantine fault tolerance (PBFT) protocol using secure hardware such as that provided by the software guard extensions (SGX) program from INTEL. Based on the assumption that even faulty nodes cannot manipulate a sequence of request messages as the number is assigned by the secure hardware, EBFT reduces the total number of nodes from 3f+1 to 2f+1 compared to PBFT in order to resist f faulty nodes in the system. EBFT uses two rounds of communication (PREPARE and COMMIT) to accept a request message. A node receiving f+1 COMMIT messages signed by different nodes has the assurance that the request message has been finalized in the system.

Therefore, for each consensus network or sidechain, or a chain maintaining a private ledger that can talk to other chains, with n nodes, the system can tolerate up to $$\left\lfloor \frac{n-1}{2} \right\rfloor$$

faulty nodes f.

Preferably, two consensus layers are maintained in the system, namely, a consensus layer within the central bank and a consensus layer among the participating regular banks and the central bank. The central bank preferably maintains multiple machines to increase its reliability. A private ledger is used to maintain consensus over the account balances of all the regular banks, and over all the decisions made to permit/deny transaction requests. Regulations enforcement (e.g., credit limit, embargoed country policy, etc.) can be realized by smart contracts as described below.

Referring now to FIG. 1 schematically illustrating the system according to an embodiment of the present invention, the system includes a central bank CB which has a plurality of nodes (three in the embodiment schematically shown) within a mainchain, as well as regular banks A, B, C, and D. Regular banks A and B are within a first sidechain 1 and regular banks C and D are within a second sidechain 2. Preferably, in practice, each regular bank will form a sidechain (maintain a separate private ledger) with every other regular bank that it deals with, along with some central bank nodes. Consensus is maintained over the transaction histories, namely the private ledger, so that the transactions history is consistent across banks. Preferably, each bank is able to establish a direct TLS connection to the other banks. Also, the banks are preferably able to authenticate each other with public keys retrieved from some trusted source, such as public key infrastructure (PKI) or the central bank CB ledger. As discussed above, while the present disclosure generally refers to banks, this should be understood to mean the computer systems used by the banks to perform intermediated settlement.

The central bank CB mainchain verifies payment requests validity and adds approved transactions to the CB ledger. The mainchain also provides the finality proof of approved transactions to the nodes in the sidechains, which then reach consensus on their ledger. The different nodes are represented in FIG. 1 by small circles in solid lines (three for the central bank CB and one each for the individual regular banks A, B, C and D), while the chains are indicated by dashed lines.

The example in FIG. 1 schematically illustrates the steps involved in the execution of a transaction from bank A to bank B. Once the sidechain 1 is established, bank A prepares a transaction message, such as a payment request, including different information about A and B, such as their account IDs, and a payment amount. A→B:amount or C→D:amount denotes a signed transaction representing a payment request. The sender bank will sign newly-issued transactions so that the recipient bank can assess their legitimacy. The full transaction structure's specification is presented in further detail below.

Upon bank A sending the payment request transaction Tx1 to the central bank CB within sidechain 1, the central bank CB, using its internal mainchain, will then check the correctness of the transaction, and reach consensus on its validity. One possible check would be verifying that bank A has enough money in its account to actually afford transaction Tx1. The central bank CB can verify this because central bank CB can access the account information of any participating regular bank, for example, by all of the accounts being held at the central bank CB with the account balances and transaction histories stored in memory and being constantly updated.

If consensus is reached, the transaction Tx1 is valid and the central bank will save transaction Tx1 on its CB ledger, and then forward the transaction Tx1 to both the regular banks A and B involved in the transaction Tx1, together with its finality proof. The finality proof of a transaction depends on the consensus protocol. For example, in Back, A. et al., "Enabling blockchain innovations with pegged sidechains," (2014) which is hereby incorporated by reference in its entirety herein, and which is based on Proof of Work, Simplified Payment Verification (SPV) proof is used to prove to another sidechain that a transaction is included in a block, and that enough amount of work has been done to create that block (which indicates transaction finality). In one embodiment of the present invention, a combination of EBFT and the INTEL SGX can be used the consensus protocol. Therefore, the system considers f+1 signed REPLY messages to a payment request as the transaction finality proof. Additionally, a key-homomorphic encryption scheme such as Boneh-Lynn-Shacham (BLS) can be used to merge the signatures in the REPLY messages, so that the nodes in sidechain 1 only need to verify one signature in the finality proof.

Bank A and B will in turn save the transaction Tx1 in their ledgers. Finally, the sidechain 1 nodes will reach consensus on the content of their ledgers to ensure correctness, and agree on the total order of transactions. Concretely, banks A and B will both have a private ledger that will store the exact same information about transactions Tx1 and Tx2 carried out within sidechain 1.

Throughout the process, the banks C and D of sidechain 2 will not be aware of any of the aforementioned steps happening within sidechain 1 between banks A and B and the central bank CB.

At the end of the settlement epoch, the mainchain will carry out the effective payment transactions. Effective payment transactions are virtual and do not leave any traces on the ledger (unlike payment requests, which are all recorded on the ledger). Rather, effective payment transactions can just indicate what operations the central bank CB will perform to update the accounts' balances correctly. For example, for a possible payment request sequence A→B→C→D:10, the effective payment transaction (virtual) A→D:10 is executed by reducing A's balance by 10, and increasing D's balance by 10.

Considering a naive approach with real-time settlement, a first naive approach could be used to update the account balances stored in the central bank CB after every transaction. Such updates to the account balances are sequential and automatic. For example, suppose that the central bank processes the following set of transactions:

E→A: 15
A→B: 5
A→D: 10
C→D: 2

To reflect the effects of these four transactions on the account balances, the central bank would have to perform the following updates:

decrease E's balance by 15, and increase A's balance by 15,
decrease A's balance by 5, and increase A's balance by 5,
decrease A's balance by 10, and increase A's balance by 10, and
decrease C's balance by 2, and increase A's balance by 2.

With this approach, a transaction is directly translated to account balance updates and the payment is settled in real time. Additionally, the effective payment transactions correspond exactly to the payment request transactions. However, the central bank CB would need some time buffer at the end of each epoch to merge the transactions, or to determine how to perform the transfer in an optimal way. Moreover, this approach is not flexible enough to allow banks to delay the transaction's settlement time. Flexibility of settlements resolution time is useful: imagine tokens as stock options; stakeholders always prefer to sell them when they reach a desired high value.

The method and system according to embodiments of the present invention advantageously utilize an approach using tokens as unsettled payment transactions. The tokens can be transferred from one bank to another as a way of payment until the time that the settlement is due. In this approach, the account balance is split in two parts: currency balance: the amount of money in the form of currency, and token balance: the amount of money in the form of tokens.

When a token is in circulation, it is in the form of unspent transactions, for example, as is the case of a Bitcoin in circulation. These tokens can be used to carry out payments by setting them as the input of new transactions. In turn, these new transactions become the tokens owned by the recipients.

One goal of tokens is to reduce the amount of account balance updates at any given time. The following example provides a simple illustration of how tokens can be advantageously used to reduce the necessary amount of account balance updates. In the example, the individuals correspond to the banks and, in practice, the banks would carry out the transactions Example 1

Goals:
1) Angela has to give 10 dollars to Bob.
2) Bob has to give 10 dollars to Carl.

Steps:
1) Angela takes 10 dollars from her wallet and gives it to Bob.
2) Bob, instead of putting Angela's 10 dollars in his wallet (thereby, modifying his wallet balance), gives the 10 dollars directly to Carl.
3) Carl then puts the 10 dollars in his wallet, increasing his wallet balance.

In the example above, Bob gave Carl the 10 dollar bill received from Angela, not a 10 dollar bill from his wallet. Bob did not even open his wallet. The tokens in embodiments of the present invention virtualize this process. Bank B (Bob), does not update its balance with the money received from bank A (Angela), but rather it uses bank A's transaction (the 10 dollar bill) as a token to pay bank C (Carl). When bank C redeems this token (i.e., Carl puts the 10 dollars in his wallet), the central bank CB will acknowledge that the token is referring to a transaction originating from bank A, and will therefore transfer 10 dollars from bank A to bank C directly, leaving Bank B's balance untouched. Thus, in this simplified example, the use of tokens is the virtual equivalent of bank B giving the 10 dollar bill from bank A to bank C.

The payment request issued by a bank can leverage existing tokens, or be used as a future token by the recipient. Therefore, preferably two types of transactions for the payment request are used: tokenize transaction and token transaction. These transactions have the same data structure, but some values do not have the same meaning as discussed in the following.

Tokenize transaction: this type of transaction is issued when a bank does not own any token. In this case, the amount of money that the bank wants to send is used as the input of the transaction. In other words, a bank tokenizes the money of its currency balance to form a payment request, because the transaction becomes a newly created token that can be used by the receiver bank to perform subsequent token transactions. The CB sidechain will reduce the amount indicated in the token input field from the sender bank's currency balance. Table 1 sets forth the basic structure of a tokenize transaction. In step 1) of the example above, bank A (Angela) would issue a tokenize transaction $T_1 = \langle 10, Sig_A, 10, PubKey_B \rangle$.

TABLE 1

Transaction message (token) format of a tokenize transaction

| Field | Description |
| --- | --- |
| Input | The amount of money to be sent. This amount will be subtracted from the sender bank's account balance during settlement. |
| scriptSig$_{SND}$ | Script to verify the token ownership, for example, the signature of the sender. |
| List of output | Output amounts which sum up until the input amount. |
| List of scriptPubkey$_{RCV}$ | Script indicating the ownership of the receiver, for example, the public key of the receiver. |

Token transaction: this type of transaction is issued when a bank transfers the ownership of the tokens owned by that bank as a payment request. In this case, a previous unspent token is used as the input of the transaction. Table 2 set forth the basic structure of a token transaction. In step 2) of the example above, bank B (Bob) would issue a token transaction $T_2 = \langle T_1, Sig_B, 10, PubKey_C \rangle$.

TABLE 2

Transaction message (token) format of a token transaction

| Field | Description |
| --- | --- |
| List of inputs | The reference to one or more tokens belonging to the sender. |
| scriptSig$_{SND}$ | Script to verify the token ownership, for example, the signature of the sender. |
| List of output | The amount of money that this token will be worth when redeemed at the end of the epoch. |
| List of scriptPubkey$_{RCV}$ | Script indicating the ownership of the receiver, for example, the public key of the receiver. |

These transactions $T_1$ and $T_2$ (payment requests) are sent to the central bank CB mainchain for verification of their validity. Concretely, with tokenize transactions, the CB mainchain will additionally check the available credits of the sender bank A's currency balance. With token transactions, the CB mainchain will additionally verify if the input token(s) are on the CB ledger and have not been spent or redeemed (i.e., convert to currency balance) yet.

Since all payment requests will first be sent to the CB sidechain, the central bank CB has the global view of all transactions in the system and thus is qualified to perform verification. Therefore, a valid approval decision from the CB sidechain can be trusted by all banks.

To redeem a token, a redeem transaction will be created and sent to a special address. The CB sidechain will verify the redeem transaction and add the output amount of the transaction to the currency balance of the bank who owns the redeemed token.

The token's owner can initiate the redeem transaction at any time. In step 3) of the previous example, bank C (Carl) would issue a redeem transaction $T_3 = \langle T_2, PubKey_C, 10, Address_{redeem} \rangle$. If the token's owner prefers to leave the redemption process to the CB sidechain, this can be indicated in the settlement resolution strategy (e.g., due time) in the scriptPubKey field of the token. For example, a token with scriptPubKey=$\langle PubKey_A \vee (dueTime \wedge ThresholdPubKey_{CB} \rangle$ means that the token can be redeemed by bank A with a redeem transaction, or when the settlement due time is reached and a threshold signature of nodes in the sidechain is provided.

The central bank CB preferably uses a smart contract to keep the account information of all regular banks and perform most regulatory functions. The contract structure can be provided as follows:

TABLE 3

Smart contract structure

| Type | Attribute/Method Name | Description |
| --- | --- | --- |
| Data | banksBalances | A map of bankID to its corresponding balance. The balance is an array storing three values for each bank. (bankID →[currencyBalance, tokenBalance, credit]) |
| Method | sendTransaction(Transaction t) | This method is called whenever a bank wants to send a transaction to another bank. It takes the desired transaction t as a parameter. |
| | validateTransaction(Transaction t) | This method is executed by the CB mainchain after receiving a call to sendTransaction(t). The method verifies the legitimacy of transaction t. |
| | forwardTransaction(Transaction t) | This method is called by the CB mainchain if validateTransaction(t) returns true (i.e., the transaction is valid). The method generates a finality proof for transaction t and forwards it on to the relevant sidechain |

Whenever a bank wants to send a transaction, it calls the sendTransaction( ) method of the smart contract. The contract, in turn, will perform a series of checks on the transaction and return either true or false, depending on the current state of the account of the sender bank. If a transaction passes the tests, the contract sends to its intended recipient by calling the forwardTransaction( ) method. The smart contract is a protocol which can be used by the computer systems of all of the participating banks. Accordingly, the CB mainchain according to an embodiment of the present invention can be a virtual mainchain. Banks can run their own contracts themselves.

The central bank also maintains a global address list smart contract from which the regular banks in the system can obtain the public key, and connection information, of other banks. If a certain bank wants to establish a private connection with another bank, it can request its address to the smart contract. The contract structure can be provided as follows:

TABLE 4

| | Global address list smart contract structure | |
|---|---|---|
| Type | Attribute/Method | Description |
| Data | bankAddresses | A map of BankID to each corresponding bank address in the network.<br>(bankID → bankAddress) |
| Method | getBankAddress(bankID id) | This method returns the bank's address for the given bankID.<br>bankAddresses[id] → bankAddress |

Embodiments of the present invention provide the following advantages and advancements over known systems:
- Using different consensus layers and access scopes to increase privacy and reduce the number of transactions in the network and in the ledgers,
- Creating and interconnecting a large set of participants using small and fast private interconnected ledgers,
- Combining the use of tokens, or unspent transactions, with the smart contract account model to decrease the number of effective payment transactions to fulfill interbank payments and allow the transfer of assets from one private ledger to another,
- Using a REPLY message with f+1 merged signatures from an EBFT consensus protocol as a finality proof of transactions,
- Relying on a Byzantine fault tolerant system coupled with trusted computing anchors in order to reduce the communication rounds and thus increase the system performance,
- Increasing the robustness of the banking system with a distributed ledge,
- Increasing the scalability of Byzantine fault tolerant consensus protocols by creating small, but interconnected private ledgers which individually can be effectively handled, for example, by EBFT consensus protocols (which, for example, could otherwise be limited to around 10-20 nodes for a ledger),
- Decreasing the load of transaction messages in the system using private ledgers, and facilitating cross-ledger transactions,
- Enabling the central bank CB to publish/enforce financial regulations on all interbank transactions in a flexible manner, and/or
- Decreasing the number of necessary transactions to resolve a settlement, thereby resulting in reduced transaction fees.

Thus, embodiments of the present invention provide a number of improvements to the functioning of the computer systems of the central bank CB and the participating regular banks. By using the novel structure of small, but interconnected private ledgers through the central bank CB mainchain, significantly less information must be generated and handled, while security is increased by centralizing verification at the central bank CB and protecting information from banks which are not part of a particular sidechain of a transaction. Moreover, less information must be changed and stored, thereby resulting in greater processing capabilities and lesser storage device space to handle further transactions in real time.

Figure 2:
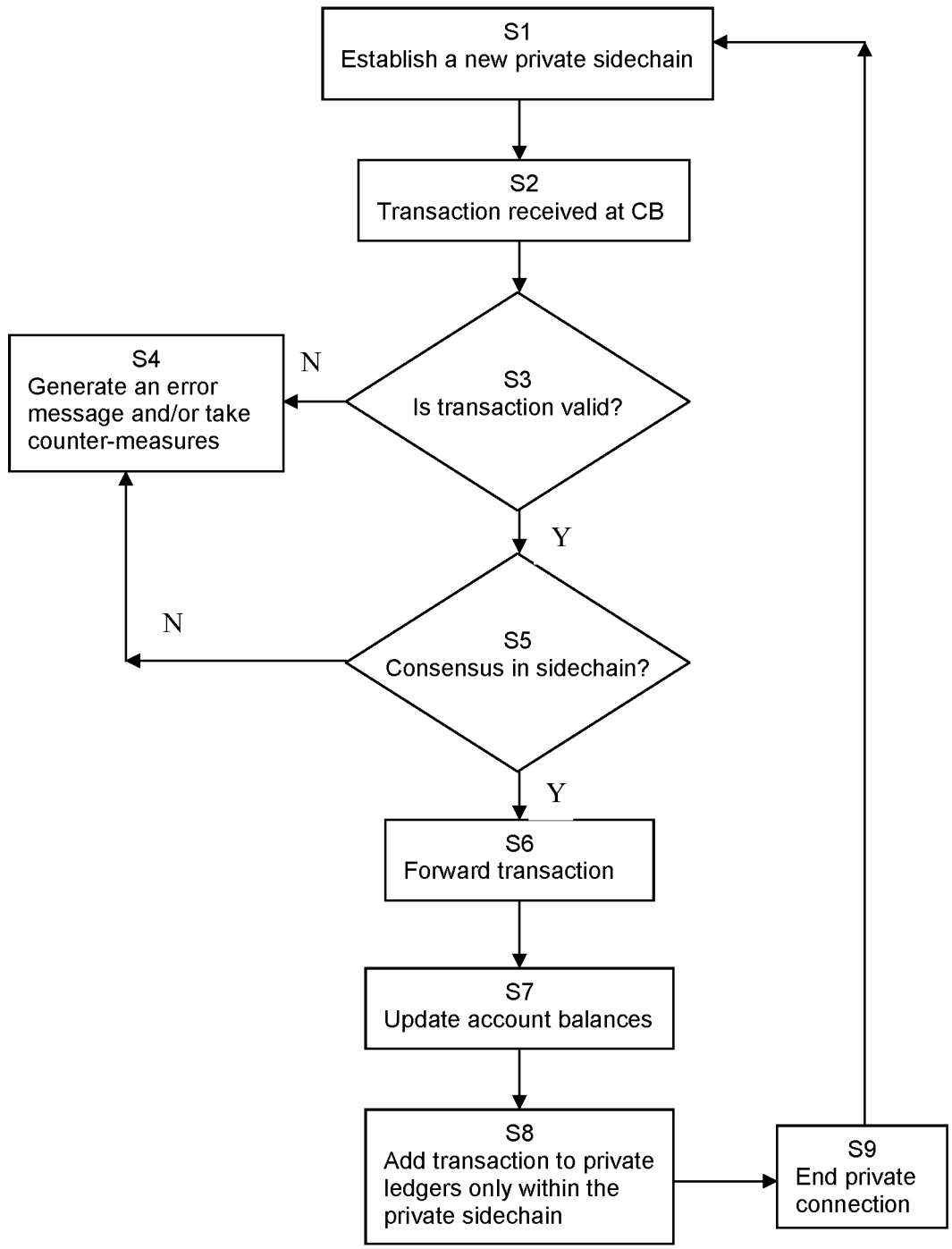
FIG. 2 is a flow chart showing a method of receiving a transaction and creating or updating a small private ledger in accordance with an embodiment of the present invention.

Referring to FIG. 2, a flow chart of a method according to an embodiment of the present invention for providing real-time settlements resolution, while minimizing the bureaucratic steps in the system, is shown. In a first step S1, the sender bank sends a connection request to the central bank CB and the receiver bank via a secure communications network. The purpose of this request is to establish a new private sidechain between the three banks. The connection can be established over a secure transport layer security (TLS) channel. In a step S2, the sender bank sends the transaction to the central bank CB internal mainchain using the sendTransaction method of the smart contract protocol. In a step S3, the central bank CB mainchain will check the validity of the transaction using the validate Transaction method of the smart contract protocol. For example, a Turing complete program uploaded to the CB mainchain can automatically perform all the required checks on the transaction data (e.g., verifying that the sender bank has enough balance to afford the transaction). If the transaction is invalid, an error message will be sent to the sender bank in a step S4. Other actions or counter-measures could be taken as well, including issuing fees or disciplinary actions, if necessary, such as placing a hold on further transactions. If the transaction is valid, in a step S5, the central bank CB mainchain will employ the EBFT consensus protocol to reach consensus within the relevant sidechain and, upon reaching consensus, will forward the transaction to the receiver bank in a step S6 using the forwardTransaction method of the smart contract protocol. In this case, the receiver bank can receive a cryptographic proof of f+1 signed REPLY messages that the central bank did approve the transaction, or in other words, that the central bank CB mainchain reached consensus in the relevant sidechain on the validity of the transaction. The proof could comprise an aggregated signature of f+1 nodes, or could simply consist of f+1 distinct signatures on the same message. If consensus is not reached, a fault is identified, such as hacks or malware, and control can proceed to step S4 where notification or error messages can be generated and sent to proper authorities and, for example, sanctions could be placed on the banks requesting the transactions.

In a step S7, the central bank CB, using the smart contract protocol, will maintain and update the correct balance account for each participant bank in the sidechain within a memory of the central bank CB computer system. In a step S8, the sender bank, receiver bank, and the central bank CB add the transaction to their ledgers and will continue to maintain consensus over the content of their ledgers to ensure the correctness of the transaction history. In a step S9, the private connection can be closed as the transaction has been finalized. The system can then, or at any time, begin a new private sidechain with different participants.

A further step performed by the CB mainchain as described above is the transfer of assets among the sidechains, preferably using tokens, as discussed above. In particular, by advantageously using the above-described system of small, but interconnected private ledgers, this transfer of assets among the sidechains can be performed using a fewer number of transactions and increased privacy.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method of providing secure ledger distribution for interbank settlement, the method comprising:
    establishing a first private sidechain among a centralized computer system of a central bank and computer systems of at least a first sender bank and a first receiver bank, each of which have an account with the central bank in a mainchain of the central bank;
    receiving, by the centralized computer system, a first transaction from the computer system of the first sender bank as a first payment request;
    determining, by the centralized computer system, whether the first transaction is valid;
    employing, by the centralized computer system, a consensus protocol to provide a first finality proof of the first transaction;
    forwarding, by the centralized computer system, the first transaction to the computer system of the first receiver bank along with the first finality proof; and
    updating the accounts of the first sender bank and the first receiver bank in the mainchain and adding the first transaction to a first private ledger accessible only within the first private sidechain.

2. The method according to claim 1, wherein the first transaction is a token transaction or a tokenize transaction, and wherein tokens generated or redeemed are used to facilitate an asset transfer among the first private sidechain and at least a second private sidechain.

3. The method according to claim 1, further comprising:
    establishing a second private sidechain among the centralized computer system and computer systems of at least a second sender bank and a second receiver bank, each of which have an account with the central bank in the mainchain of the central bank;
    receiving, by the centralized computer system, a second transaction from the computer system of the second sender bank as a second payment request;
    determining, by the centralized computer system, whether the second transaction is valid;
    employing, by the centralized computer system, a consensus protocol to provide a second finality proof of the second transaction;
    forwarding, by the centralized computer system, the second transaction to the computer system of the second receiver bank along with the second finality proof; and
    updating the accounts of the second sender bank and the second receiver bank in the mainchain and adding the second transaction to a second private ledger accessible only within the second private sidechain,
    wherein the first and second private sidechains have different participants from each other.

4. The method according to claim 3, wherein the first transaction is a tokenize transaction and the second transaction is a token transaction, and wherein tokens generated or redeemed are used to facilitate an asset transfer among the first private sidechain and at least the second private sidechain.

5. The method according to claim 4, wherein the first receiver bank and the second sender bank are the same bank, and wherein the centralized computer system applies tokens received from the tokenize transaction to the token transaction.

6. The method according to claim 5, further comprising receiving, by the centralized computer system, a redeem request from the second receiver bank to redeem the tokens and updating a balance of the account of the second receiver bank.

7. The method according to claim 6, wherein a balance of the account of the bank which is the first receiver bank and the second sender bank is not updated throughout the first and second transactions.

8. A computer system of a central bank using secure distributed ledger technology for interbank settlement, the computer system comprising one or more processors or servers, which alone or in combination, are configured to:
    establish a first private sidechain among itself and computer systems of at least a first sender bank and a first receiver bank, each of which have an account with the central bank in a mainchain of the central bank;
    receive a first transaction from the computer system of the first sender bank as a first payment request;
    determine whether the first transaction is valid;
    employ a consensus protocol to provide a first finality proof of the first transaction;

forward the first transaction to the computer system of the first receiver bank along with the first finality proof; and update the accounts of the first sender bank and the first receiver bank in the mainchain and add the first transaction to a first private ledger accessible only within the first private sidechain.

9. The computer system according to claim 8, being further configured to perform the first transaction as a token transaction or a tokenize transaction based on whether the account of the first sender bank has tokens, and to use tokens generated or redeemed to facilitate an asset transfer among the first private sidechain and at least a second private sidechain.

10. The computer system according to claim 8, being further configured to:

establish a second private sidechain among itself and computer systems of at least a second sender bank and a second receiver bank, each of which have an account with the central bank in the mainchain of the central bank;

receive a second transaction from the computer system of the second sender bank as a second payment request;

determine whether the second transaction is valid;

employ a consensus protocol to provide a second finality proof of the second transaction;

forward the second transaction to the computer system of the second receiver bank along with the second finality proof; and update the accounts of the second sender bank and the second receiver bank in the mainchain and add the second transaction to a second private ledger accessible only within the second private sidechain, wherein the first and second private sidechains have different participants from each other.

11. The computer system according to claim 10, being further configured to perform the first transaction as a tokenize transaction based on the account of the first sender bank not having enough tokens to fulfill the first payment request, and to perform the second transaction as a token transaction based on the account of the second sender bank having enough tokens to fulfill the second payment request.

12. The computer system according to claim 11, wherein the first receiver bank and the second sender bank are the same bank, and wherein tokens received from the tokenize transaction are used for the token transaction.

13. The computer system according to claim 12, being further configured to update a balance of the account of the second receiver bank in response to a redeem request received from the second receiver bank to redeem the tokens.

14. The computer system according to claim 13, wherein a balance of the account of the bank which is the first receiver bank and the second sender bank, stored in a memory of the computer system of the central bank, is not updated throughout the first and second transactions.

15. A tangible, non-transitory computer-readable medium containing instructions thereon which, upon being executed by a computer system including one or more processors or servers, permits the following steps to be carried out:

establishing a private sidechain among a centralized computer system of a central bank and computer systems of at least a sender bank and a receiver bank, each of which have an account with the central bank in a mainchain of the central bank;

receiving a transaction from the computer system of the sender bank as a payment request;

determining whether the transaction is valid;

employing a consensus protocol to provide a finality proof of the first transaction;

forwarding the transaction to the computer system of the receiver bank along with the finality proof; and updating the accounts of the sender bank and the receiver bank in the mainchain and adding the transaction to a private ledger accessible only within the private sidechain.

16. The method according to claim 1, wherein the consensus protocol is Byzantine fault tolerant.

17. The method according to claim 16, wherein the consensus protocol is an efficient Byzantine fault tolerant (EBFT) protocol.

18. The method according to claim 1, wherein all transactions for the first or another private sidechain are handled by the centralized computer system of the central bank which comprises a plurality of nodes in the mainchain.

* * * * *